US006583659B1

(12) United States Patent
Kwong et al.

(10) Patent No.: US 6,583,659 B1
(45) Date of Patent: Jun. 24, 2003

(54) REDUCED CLOCK-SKEW IN A MULTI-OUTPUT CLOCK DRIVER BY SELECTIVE SHORTING TOGETHER OF CLOCK PRE-OUTPUTS

(75) Inventors: David Kwong, Fremont, CA (US); Kwong Shing Lin, Sunnyvale, CA (US)

(73) Assignee: Pericom Semiconductor Corp., San Jose, CA (US)

( * ) Notice: Subject to any disclaimer, the term of this patent is extended or adjusted under 35 U.S.C. 154(b) by 0 days.

(21) Appl. No.: 09/683,744

(22) Filed: Feb. 8, 2002

(51) Int. Cl.[7] .................................................. G06F 1/04
(52) U.S. Cl. ........................ 327/295; 327/112; 327/415; 326/86; 365/233
(58) Field of Search ................................. 327/291, 293, 327/295–297, 403, 404, 395, 108, 109, 112, 387, 415; 375/356; 365/233, 233.5; 326/82, 83, 85, 21–28, 86–87, 93, 95

(56) References Cited

U.S. PATENT DOCUMENTS

| 4,860,322 A | * | 8/1989 | Lloyd .......................... 375/356 |
| 5,319,258 A | | 6/1994 | Ruetz ........................... 326/21 |
| 5,341,040 A | | 8/1994 | Garverick et al. ............. 326/27 |
| 5,444,407 A | * | 8/1995 | Ganapathy et al. ......... 327/295 |
| 5,663,664 A | | 9/1997 | Schnizlein .................... 326/83 |
| 5,727,166 A | | 3/1998 | Klinck .......................... 326/83 |
| 5,864,506 A | | 1/1999 | Arcoleo et al. ......... 365/189.05 |
| 5,926,651 A | | 7/1999 | Johnston et al. .............. 710/52 |
| 6,020,757 A | | 2/2000 | Jenkins, IV ................... 326/39 |
| 6,091,663 A | * | 7/2000 | Kim et al. ................... 365/233 |
| 6,177,810 B1 | | 1/2001 | Loeffler ....................... 326/87 |
| 6,184,703 B1 | | 2/2001 | Vest et al. .................... 326/27 |
| 6,198,329 B1 | | 3/2001 | Ezell et al. ................. 327/307 |
| 6,255,884 B1 | * | 7/2001 | Lewyn ........................ 327/295 |

* cited by examiner

Primary Examiner—Minh Nguyen
(74) Attorney, Agent, or Firm—Stuart T. Auvinen

(57) ABSTRACT

A clock driver chip has several banks of clock outputs driven by a single clock reference. Each clock output is driven by large pull-up and pull-down transistors, which have gates driven by pre-driver lines generated by a pre-driver circuit. Individual clock outputs, or a bank of outputs, are enabled by enable signals. A shorting switch is activated when enables for a pair of clock outputs are in a same state. The shorting switch has two transmission gates. One transmission gate shorts the pre-driver lines to the large p-channel transistors of the pair of outputs, while the other transmission gate shorts the pre-driver lines to the large n-channel transistors of the pair of outputs. Pre-driver lines to the pull-up transistors within a bank driven by the same enable can be hardwired together, as can the pre-driver lines to the pull-down transistors. Shorting switches can short banks together to reduce output skew.

20 Claims, 8 Drawing Sheets

US 6,583,659 B1

REDUCED CLOCK-SKEW IN A MULTI-OUTPUT CLOCK DRIVER BY SELECTIVE SHORTING TOGETHER OF CLOCK PRE-OUTPUTS

BACKGROUND OF INVENTION

This invention relates to clock driver integrated circuits (IC's), and more particularly to reducing skew between output drivers.

Many complex computer, network, or other electronic systems sequence through a series of states during operation. These states are often defined on a fundamental level by binary states of flip-flops or registers that store inputs when a clock input rises or falls. Design of such systems is facilitated by using clock signals that are synchronized to one another, so that many or all of the flip-flops are clocked at the same time. Such systems are known as synchronous circuits.

Some systems can have thousands of flip-flops that have clock inputs derived from a single clock source or reference. Although different flip-flops may receive local clock signals that are buffered or even gated by other logic signals, these local clock signals can be traced upstream to a common clock source.

FIG. 1 shows a clock tree. Master clock source 10 generates a master or reference clock, perhaps from a clock input to a chip, or from a pair of inputs connected to an external crystal or oscillator, or even internally from a ring oscillator. First-level buffer 14 buffers the reference clock, ensuring that downstream loading or coupling does not effect master clock source 10. Second-level buffers 16 fan out the buffered reference clock to produce several secondary clocks. These secondary clocks drive the many inputs to clock buffers 12, each of which drives a clock line Y1, Y2, ... Y(N). These clock lines can be routed internally to registers, state machines, and flip-flops, or can be external buffers that drive off-chip clocks to other chips in the system. Having many clock output lines allows line loading to be more evenly distributed. When loads are evenly distributed, clock skews can be minimized.

FIG. 2 is a waveform highlighting clock skew between clock lines. Clock signals can be measured at the point in time when their voltages cross over a threshold voltage Vth. Clock signal Y(J) for the $J^{th}$ clock line is somewhat faster than clock signal Y(K) for the $K^{th}$ clock line. The difference in time that the two clock signals cross the threshold is known as the clock skew. Clock skews for rising and falling edges usually differ slightly.

The maximum clock skew occurs when output Y(J) is the fastest of all N clock lines, and output Y(K) is the slowest of all clock lines. This maximum clock skew limits the maximum frequency that the reference clock can operate at. For example, if the clock skew were as large as the clock period, one flip-flop driven by a fast clock line could be clocked twice before a flip-flop driven by a slow clock line is clocked once. Data could be fed through faster-clocked flip-flops and get ahead of data in slower-clock flip-flops.

Even when clock loads are distributed evenly among the clock lines, some clock skew still occurs due to parasitic resistances within a clock driver chip. FIG. 3 highlights clock skews caused by physical layouts of clock drivers along power and ground busses in a clock driver chip. Second-level buffer 16 drives a group of pre-drivers 20, 21, 22, ... 28. Each pre-driver 20–28 drives a pre-drive line P1, P2, P3 ... PN, which is an input to output buffers 30, 31, 32, ... 38. Output buffers 30–38 drive clock output lines Y1, Y2, Y3, ... YN.

In an actual integrated circuit chip, outputs Y1, Y2, Y3 ... YN are spread around the perimeter of the chip, driving large output bonding pads that have metal wires bonded to them. Other pads are bonded to power-supply and ground wires. The distance from the power pad to each pre-driver varies with the location of the output pad. Likewise, the distance from the ground pad to each pre-driver also varies.

Outputs that are farther away from the ground or power pad have a larger parasitic resistance in the power or ground connection. For example, pre-driver 22 has three resistors 18 between its power input V3 and the power pad, while pre-driver 20 has only one resistor 18 in its s power input V1 power path. Last pre-driver 28 has N resistors 18 in its power input VN.

The ground pad is often located away from the power pad. In this example, the ground pad is located at the opposite side of the N outputs from the power pad. Thus second pre-driver 21 has two resistors 18 from its power input V2 to the power pad, but N-1 resistors 19 from its ground input G2 to the ground pad.

Although power and ground bus topology differs for different chip designs, these distributed resistances and capacitances always cause skew. For example, first pre-driver 20 has a short connection to power, but a long connection to ground. Pre-drive line P1 may have a faster rise time that other pre-drivers, due to the short path to power, but a longer fall time, due to the long path to ground.

Although the parasitic resistors 18, 19 are small, large currents can pass through, especially for clock driver chips where all outputs change simultaneously. These large simultaneous currents can cause a significant I*R voltage shift in the power and ground busses.

FIG. 4 is a waveform showing clock skew due to power and ground bus resistances. The reference clock changes, causing pre-driver lines P1, P2, PN to rise. This pulls current from the power bus, through parasitic resistors 18 of FIG. 3. Since only 1 resistor 18 is in the path to power input V1 of first pre-driver 20, V1 drops only slightly. However, V2 drops almost twice as much, since 2 resistors are in the path to V2. Power input VN to the last pre-driver experiences a large drop due to the N resistors 18 in its power path.

The reduced power input voltages V2, VN slow the rise time of pre-driver lines P2, PN, with the slowdown of PN especially pronounced. Since the pre-drivers contain at least 2 inverting stages, some current is also sunk to ground, causing ground bounce on G1, G2, GN. This also slows the propagation to pre-driver lines P1, P2, PN.

The added delay for the rise of PN causes a skew between P1 and PN. This clock skew is caused by different lengths and resistances of internal paths to power and ground. While these resistances can be reduced by using wider internal power and ground busses, they are a cause of clock skew.

What is desired is clock driver chip with reduced clock skew. It is desired to reduce skew between clock outputs.

SUMMARY OF THE INVENTION

A parallel clock driver has a reference clock and a plurality of pre-driver circuits that are responsive to the reference clock. Each pre-driver circuit outputs a pull-up pre-driver line and a pull-down pre-driver line and receives an enable signal having an enabling state that enables the pre-driver circuit to drive high and low the pull-up and pull-down pre-driver lines in response to the reference clock.

A plurality of output buffers each have a pull-up transistor with a gate driven by the corresponding pull-up pre-driver line, and a pull-down transistor with a gate driven by the corresponding pull-down pre-driver line. Each drives a clock output with the pull-up transistor and the pull-down transistor. A plurality of shorting switches each receives a pair of the enable signals for a pair of the pre-driver circuits. The shorting switch connects together the pull-up pre-driver lines generated by the pair of pre-driver circuits when the pair of enable signals is both in the enabling state. Thus the pull-up pre-driver lines are connected together by the shorting switch when the pair of the pre-driver circuits are both enabled.

DETAILED DESCRIPTION

The present invention relates to an improvement in clock drivers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that skew between outputs can be reduced by shorting together clock lines within the clock tree. In particular, pre-driver outputs are shorted together before driving the final output buffer stage. Thus the voltage potentials of the gates of the large driver transistors are equalized.

Clock driver chips often have many clock outputs that are all driven by the same reference or source clock. Some of the clock outputs may be enabled while others are disabled. For example, a system may need only; 8 clock lines but uses a 12-output clock driver chip. The clock driver chip can be configured to have 8 outputs enabled but 4 outputs disabled. Since some outputs may be disabled on a clock driver chip, shorting can be done only when the outputs are enabled.

Figure 5:
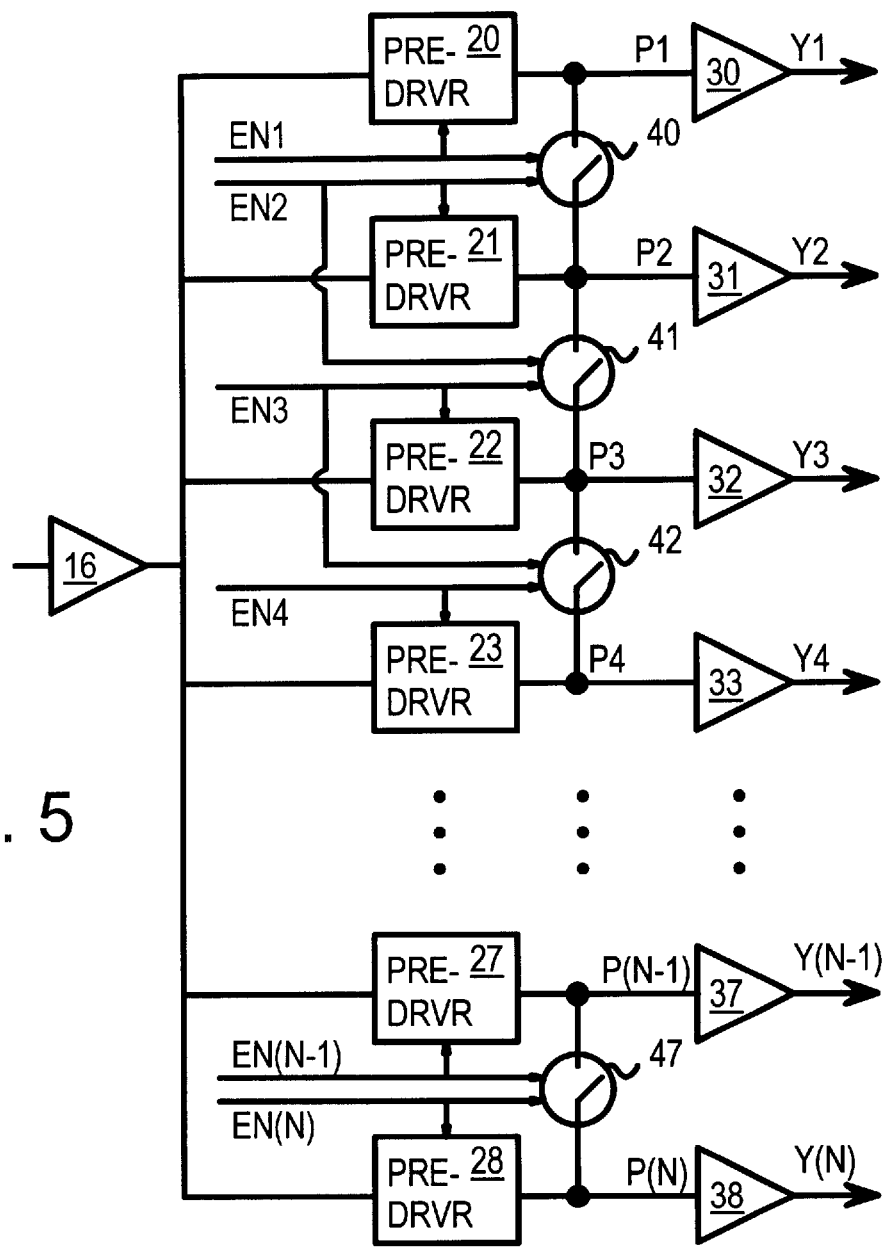
FIG. 5 is a diagram of a parallel clock driver that selectively shorts inputs to adjacent clock output buffers.

Adjacent Outputs Shorted When Both Enabled—FIG. 5

FIG. 5 is a diagram of a parallel clock driver that selectively shorts inputs to adjacent clock output buffers. Second-level buffer 16 drives data inputs to pre-drivers 20–28, for a bank of N clock outputs Y1, Y2, . . . Y(N). Pre-drivers 20-28 drive pre-driver outputs P1, P2, . . . P(N), which drive the gates of large driver transistors in output buffers 30–38 which drive the clock outputs Y1 . . . Y(N).

Pre-drivers 20–28 have two inputs: a data input that receives the clock from second-level buffer 16, and an enable input. In this embodiment, separate enable inputs EN1, EN2, . . . EN(N) are provided for each pre-driver 20–28. In other embodiments, groups of pre-drivers can share an enable signal and are enabled or disabled together as a bank of clock outputs.

Pre-driver 20 drives pre-driver line P1 with the buffered clock when its enable EN1 is in an active or enabling state, but blocks the clock and drives a constant voltage onto pre-driver line P1 when its enable EN1 is in an inactive or disabling state. Thus output buffer 30 receives a constant voltage which prevents it from pulsing its clock output Y1 when enable EN1 is inactive. Other pre-drivers 21–28 are similarly enabled and disabled by their enables EN–EN(N).

Figure 1:
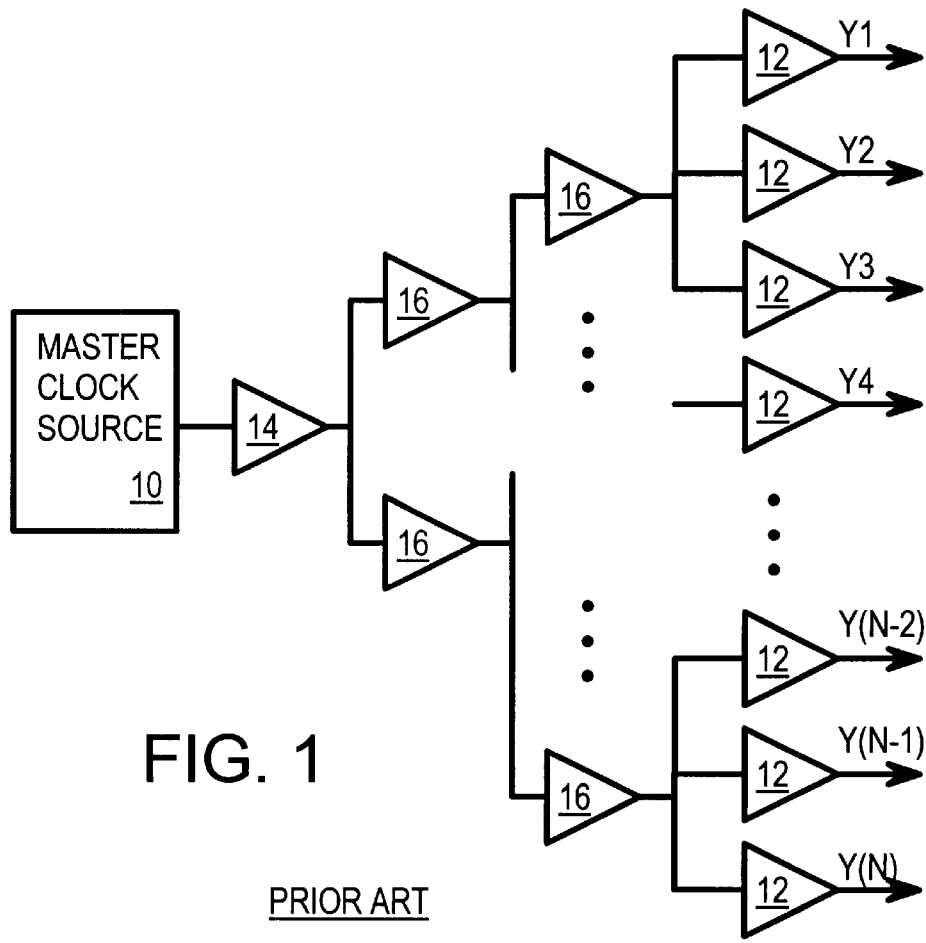
FIG. 1 shows a clock tree.
Figure 2:
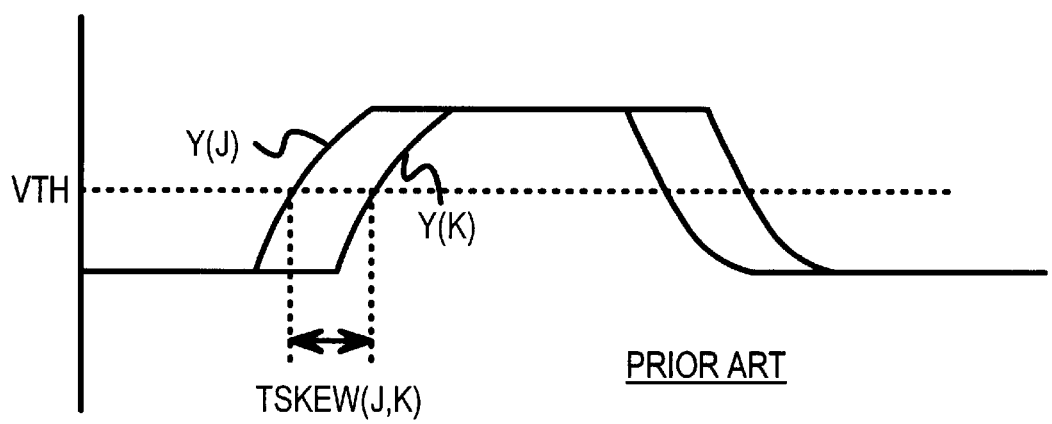
FIG. 2 is a waveform that highlights clock skew between clock lines.
Figure 3:
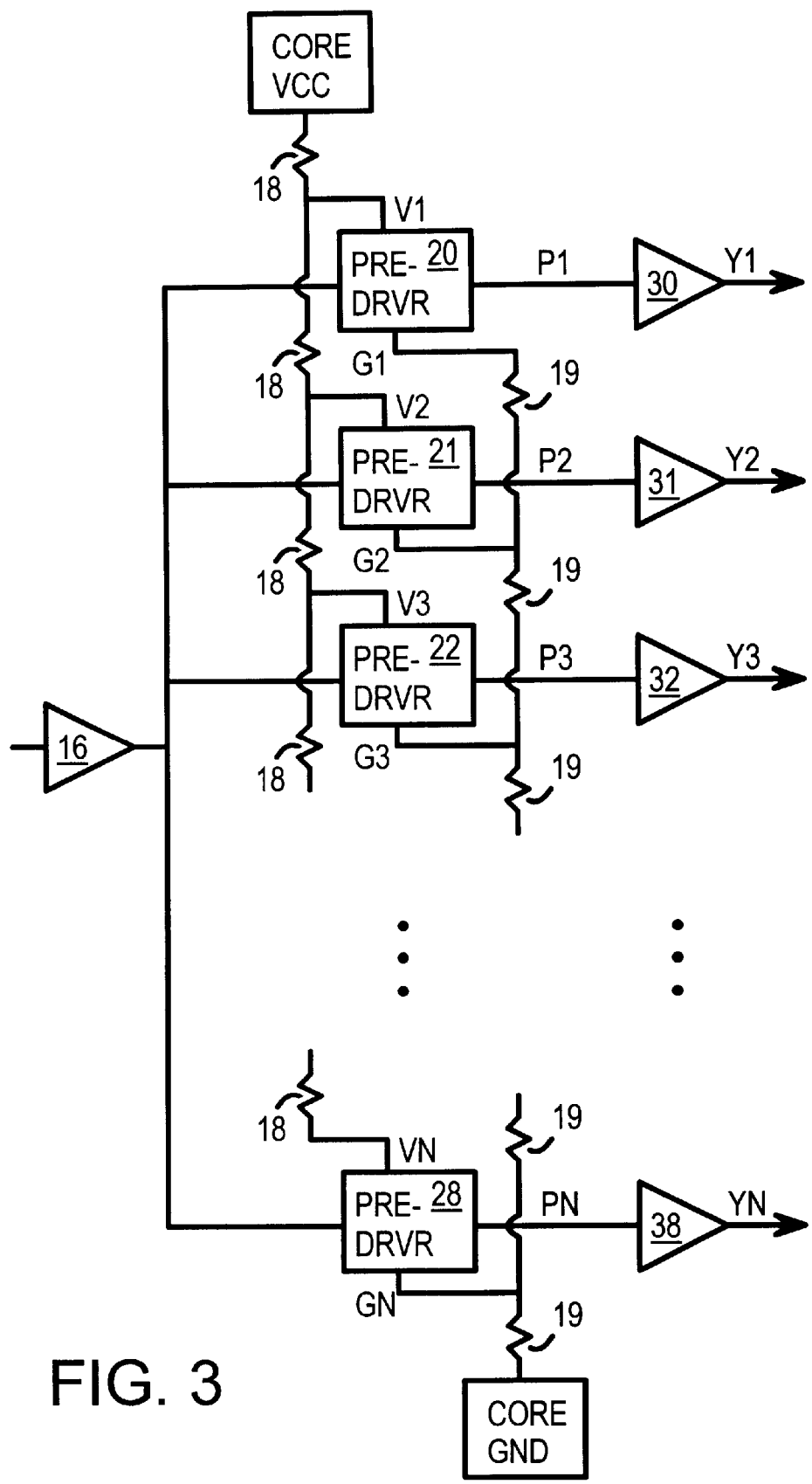
FIG. 3 highlights clock skews caused by physical layouts of clock drivers along power and ground busses in a clock driver chip.
Figure 4:
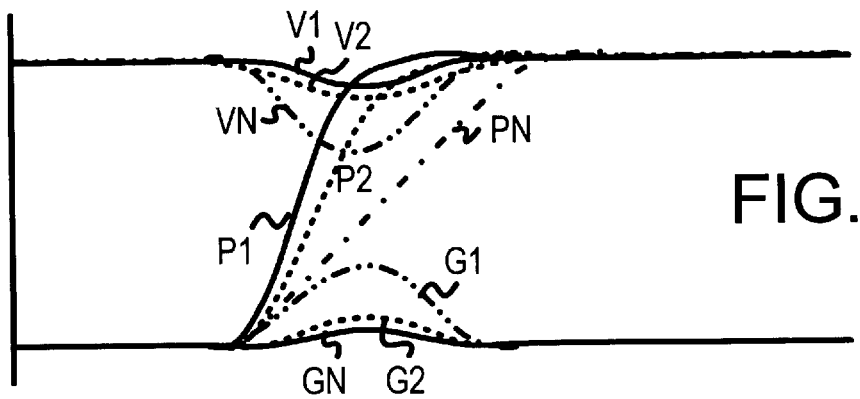
FIG. 4 is a waveform showing clock skew due to power and ground bus resistances.

The propagation delays of the secondary clock from second-level buffer 16 through pre-drivers 20–28 to pre-driver lines P1, P2, . . . P(N) varies. This propagation delay variation is caused by different resistances in power and ground busses to the pre-drivers, which are located at different physical locations on the chip. This phenomenon was shown in FIG. 3 by resistors 18, 19.

Switches 40–47 are provided to short together adjacent pre-driver lines of enabled clock outputs. For example, switch 40 shorts pre-driver line P1 to pre-driver line P2 when both pre-drivers 20, 21 are enabled. This occurs when both EN1 and EN2 are active. Switch 40 ensures that pre-driver lines P1 and P2 have the same voltage at the same time when both clock outputs Y1, Y2 are enabled. Output buffers 30, 31 are input with the same voltage waveform, and thus drive their outputs Y1, Y2 at the same time. This reduces any skew between clock outputs Y1, Y2 that might be caused by the physical layout of pre-drivers 20, 21.

Other switches are provided to short other pairs of adjacent pre-driver lines. Switch 41 shorts together pre-driver lines P2 and P3 from pre-drivers 21, 22 when both enables EN2, EN3 are active, reducing any skew between clock outputs Y2, Y3. Likewise, switch 42 shorts, together pre-driver lines P3 and P4 from pre-drivers 22, 23 when both enables EN3, EN4 are active, reducing any skew between clock outputs Y3, Y4. Switch 47 shorts together pre-driver lines P(N–1) and P(N) from pre-drivers 27, 28 when both enables EN(N–1), EN(N) are active, reducing any skew between clock outputs Y(N–1), Y(N).

The sizes of switches 40–47 can be optimized to minimize resistances between pre-driver lines that are shorted together and added capacitances to the pre-driver lines. Additional switches (not shown) can be added to short together non-adjacent pre-driver lines.

Figure 6:
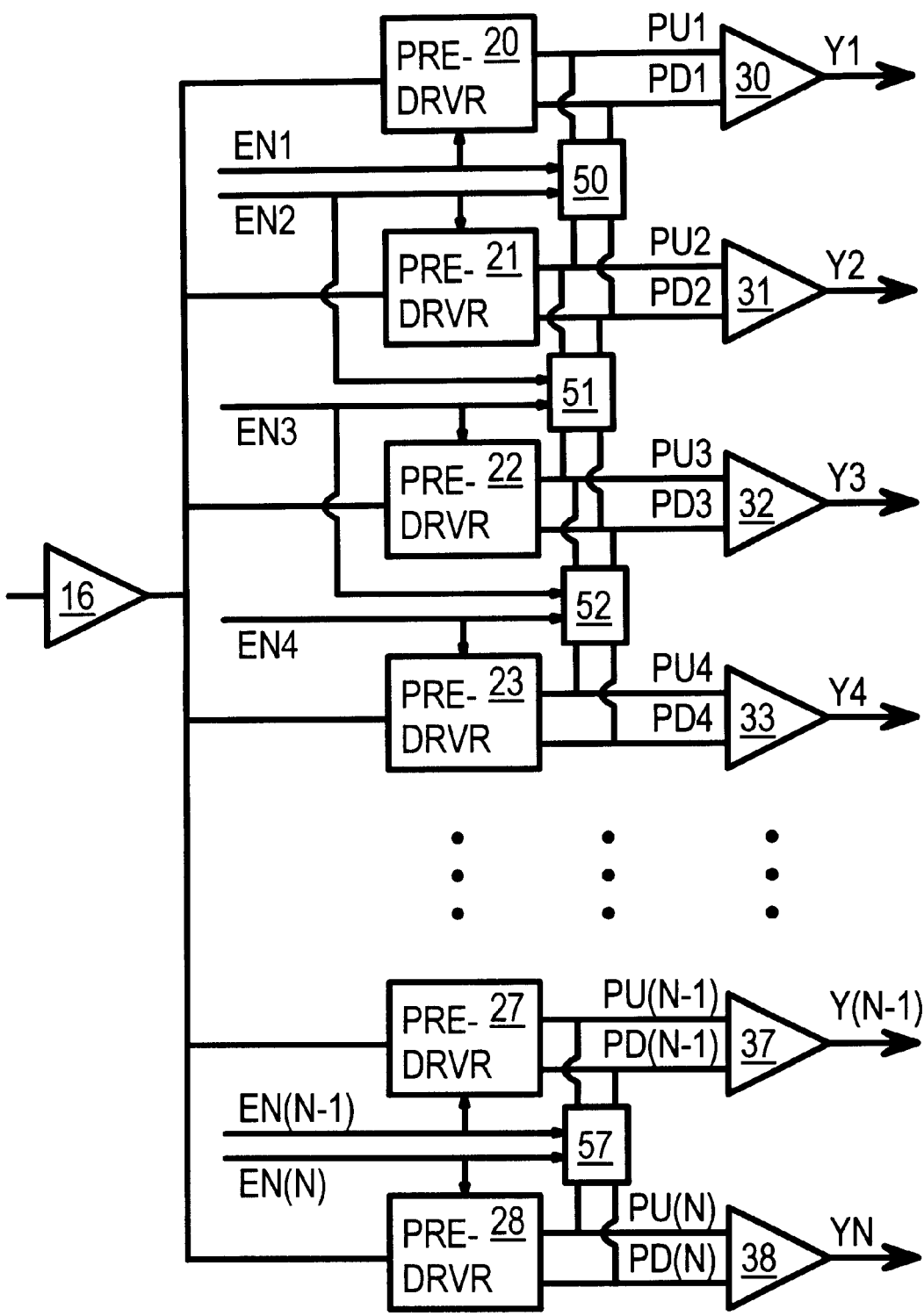
FIG. 6 is a diagram of a clock driver that shorts pairs of adjacent pre-driver pull-up and pull-down lines that drive large pull-up and pull-down transistors in output buffers.

Pull-up and Pull-Down Pre-Driver Lines Shorted—FIG. 6

FIG. 6 is a diagram of a clock driver that shorts pairs of adjacent pre-driver pull-up and pull-down lines that drive large pull-up and pull-down transistors in output buffers. Second-level buffer 1 6 drives a secondary clock to pre-drivers 20–28, which are enabled by enable lines EN1, EN2, . . . EN(N).

Pre-drivers 20–28 are complementary metal-oxide-semiconductor (CMOS) circuits that each drive a pair of pre-driver lines. Output buffers 30–38 are push-pull CMOS output buffers or clock-line drivers that have a large p-channel pull-up transistor, and a large n-channel pull-down transistor. One of the pre-driver lines is a pull-up line (such as PU1 from pre-driver 20) that drives the gate of the p-channel pull-up transistor, while the other pre-driver line is a pull-down line (such as PD1) that drives the gate of the n-channel pull-down transistor.

For example, pre-driver 22 drives pre-driver lines PU3, PD3. Line PU3 drives the p-channel pull-up transistor in output buffer 32, while line PD3 drives the n-channel pull-down transistor in output buffer 32. These pre-driver lines PU3, PD3 are driven to the same logic states when pre-driver 22 is enabled by EN3, but are driven to disabling voltages (PU3 high, PD3 low) when EN3 is inactive.

Switches 50–57 each short adjacent pull-up pre-driver lines and adjacent pull-down pre-driver lines when adjacent enables are active. For example, when both EN2 and EN3 are active, switch 51 shorts pull-up pre-driver lines PU2, PU3 together. Under these conditions, switch 51 also shorts pull-down pre-driver lines PD2, PD3 together. Thus the adjacent pull-up pre-driver lines are shorted together, as are the adjacent pull-down pre-driver lines.

Figure 7:
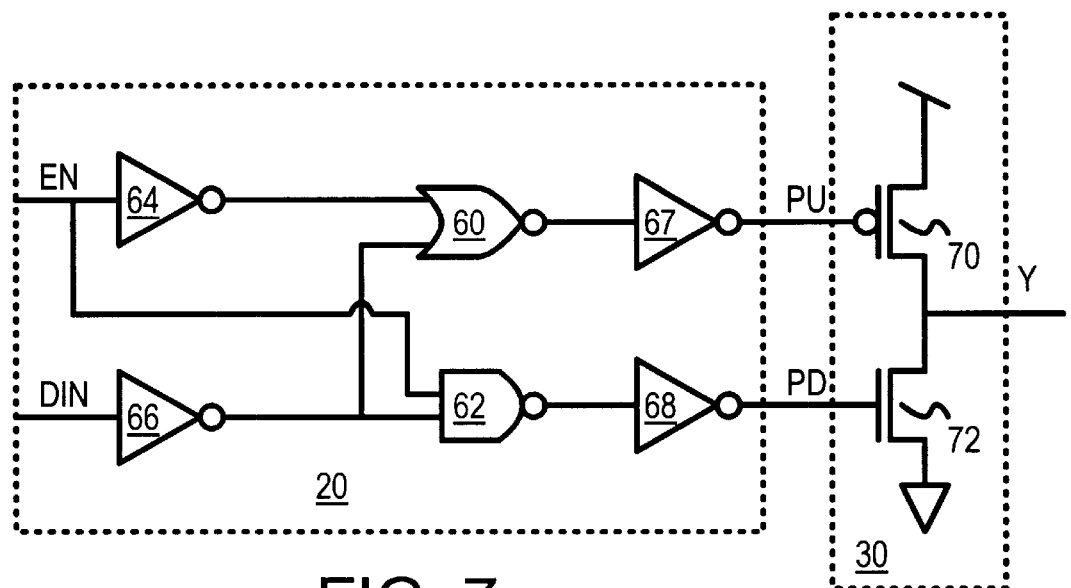
FIG. 7 is a schematic of a pre-driver and output buffer.
Figure 8:
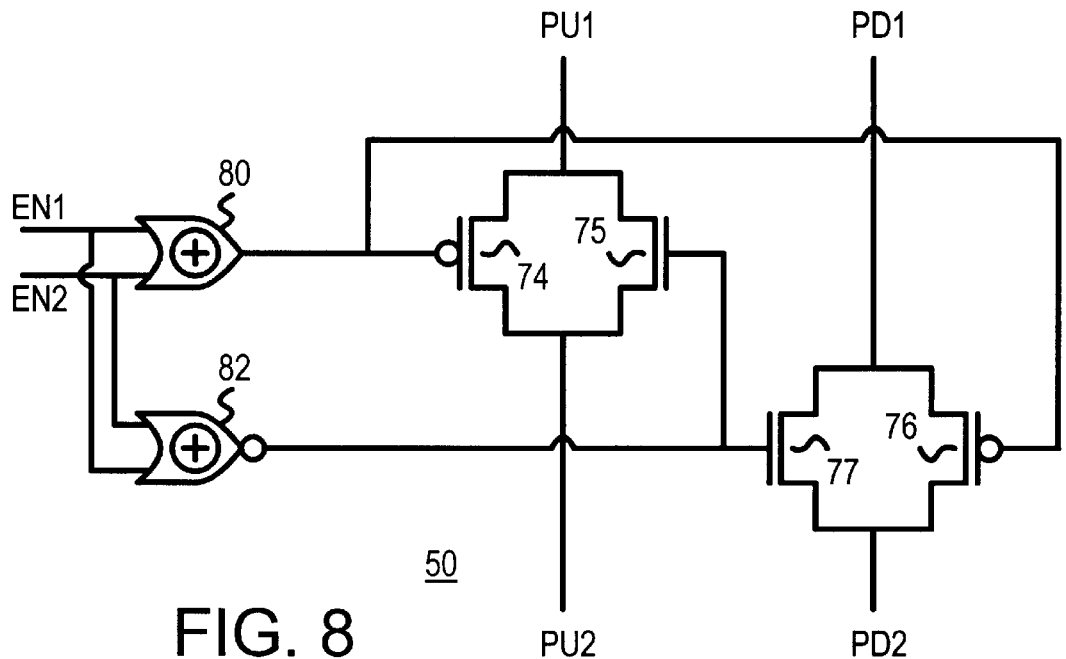
FIG. 8 is a schematic of the switch that shorts pre-driver pull-up and pull-down lines for two clock outputs.

Schematics—FIGS. 7, 8

FIG. 7 is a schematic of a pre-driver and output buffer. Pre-driver 20 receives the secondary clock as the data input DIN to inverter 66. Inverter 66 drives the inverted clock to NOR gate 60 and NAND gate 62. Inverter 64 receives the enable signal EN and drives a disable to the other inputs of NOR gate 60 and NAND gate 62.

Inverters 67, 68 invert the outputs of NOR gate 60 and NAND gate 62, respectively, to drive pre-driver lines PU, PD. In output buffer 30, pre-driver line PU drives the gate of p-channel pull-up transistor 70, while pre-driver line PD drives the gate of n-channel pull-down transistor 72. The drains of transistors 70, 72 drive the clock output Y.

When enable EN is low, NAND gate 62 outputs a high regardless of the clock input. Inverter 68 drives pre-driver line PD low, keeping n-channel pull-down transistor 72 off. Inverter 64 drives a high to NOR gate 60, which outputs a low regardless of the clock input. Inverter 67 drives pre-driver line PU high, keeping p-channel pull-up transistor 70 off.

When EN is high, the secondary clock at DIN is inverted by inverter 66, NAND gate 62, inverter 68, and n-channel pull-down transistor 72 to drive the clock output Y. NOR gate 60, inverter 67, and p-channel pull-up transistor 70 also drive the output Y. In this embodiment, the pre-driver and output buffer a non-inverting, although another inversion of the clock could be added if desired.

To drive a large capacitive load on the clock output, output buffer 30 uses large transistors, perhaps several hundred microns in total width for all legs of the transistor. Inverters 67, 68 use mid-sized transistors, perhaps one-third of the size of p-channel pull-up transistor 70 or n-channel pull-down transistor 72.

FIG. 8 is a schematic of the switch that shorts pre-driver pull-up and pull-down lines for two clock outputs. The enable signals EN1, EN2 for the two clock outputs that switch 50 selectively shorts are input to exclusive—OR (XOR) gate 80 and exclusive-NOR (XNOR) gate 82. When EN1, EN2 are in opposite logic states, XOR gate 80 outputs a high to p-channel transistors 74, 76, keeping them off. EN1, EN2 in opposite logic states causes XNOR gate 82 to output a low to n-channel transistors 75, 77, keeping them off too. Thus pre-driver lines PU1, PD1 are isolated from PU2, PD2 when either enable is off.

When both enables are on, or both enables are off, XOR gate 80 outputs a low, turning on p-channel transistors 74, 76. XNOR gate 82 outputs a high, turning on n-channel transistors 75, 77. Thus a transmission gate of transistors 74, 75 connects PU1 and PU2. Another transmission gate of transistors 76, 77 connects PD1 and PD2.

To reduce the on resistance, transistors 74, 75, 76, 77 can be made large, increasing their transconductance. The larger size reduces any clock skew between Y1 and Y2.

Figure 9:
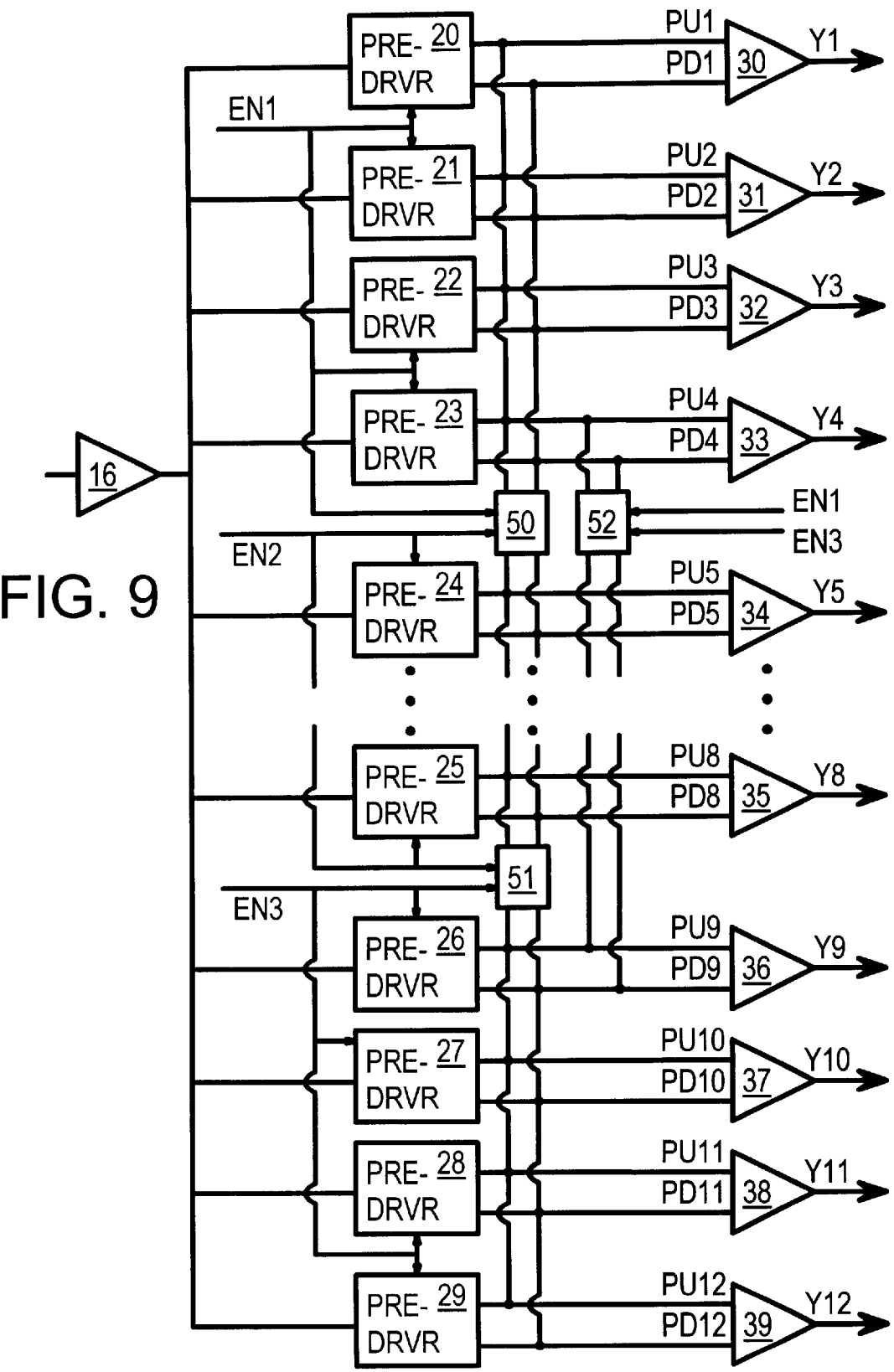
FIG. 9 shows a clock driver chip with fixed shorts between pre-driver lines for clocks within the bank, but selective shorting between banks.

Fixed Shorting of Banks, Selective Shorting Between Banks—FIG. 9

FIG. 9 shows a clock driver chip with fixed shorts between pre-driver lines for clocks within the bank, but selective shorting between banks. The clock outputs are divided into three banks of four outputs each in this embodiment. Clock outputs Y1, Y2, Y3, Y4 form a first bank, clock outputs Y5–Y8 form a second bank, and clock outputs Y9–Y12 form the third bank.

Each bank has a single enable that enables or disables all four pre-drivers and clock outputs together. EN1 enables pre-drivers 20, 21, 22, 23, EN2 enables pre-drivers 24 . . . 25, and EN3 enables pre-drivers 26, 27, 28, 29.

Since all four clock outputs in a bank are either enabled or disabled together, the pre-driver lines within the bank can be hardwired together to minimize clock skew within the bank. The pre-driver pull-up lines are shorted together separately from the pre-driver pull-down lines. Pre-driver pull-up lines PU1, PU2, PU3, PU4 are hardwired together, such as with metal lines and vias on an integrated circuit. Likewise, pre-driver pull-down lines PD1, PD2, PD3, PD4 are hard-wired together.

Bank 2 has pre-driver pull-up lines PU5–PU8 hardwired together, and pre-driver pull-down lines PD5–PD8 hardwired together. Likewise, bank 3 has pre-driver pull-up lines PU9–PU12 hardwired together, and pre-driver pull-down lines PD9–PD12 hardwired together.

Banks are selectively shorted together. Switch 50 shorts banks 1 and 2 together when enables EN1, EN2 are both active or both inactive. Switch 50 has a transmission gate that shorts the pre-driver pull-up lines from both banks, and a second transmission gate that shorts the pre-driver pull-down lines from the two banks.

Switch 51 shorts the pre-driver pull-up lines for banks 2 and 3 when EN2, EN3 are in the same state. The pre-driver pull-down lines for these banks are also shorted by switch 51 when the enables match. Any of the four pre-driver pull-up signals in a bank can be connected to switch 51, since all four pre-driver pull-up signals are hardwired together. The same is true for the pre-driver pull-down signals.

Switch 52 shorts non-adjacent banks 1, 3 when enables EN1, EN3 match. PU4 is connected to PU9 by a transmission gate, while PD4 and PD9 are connected by another transmission gate. Of course, other pre-driver lines in each bank could be selected for layout convenience.

Clock-Skew Waveforms—FIGS. 10A–D

FIGS. 10A–D are waveforms showing clock skew for different shorting schemes. All Figures show the region around the logic threshold voltage, between 1 and 2 volts, rather than show the entire voltage swing of each output. This zooming in of the voltage axis allows small clock skews to be better observed. Just the clocks' rising edges are shown; similar results are expected for the clocks' falling edges. The X-axis shows simulation time in nanoseconds. The upper clock output Y1 is the left-most line, while the lowest clock output Y12 is the right-most line. Clock outputs Y1 to Y12 are in order from left to right in all waveforms.

Figure 10A:
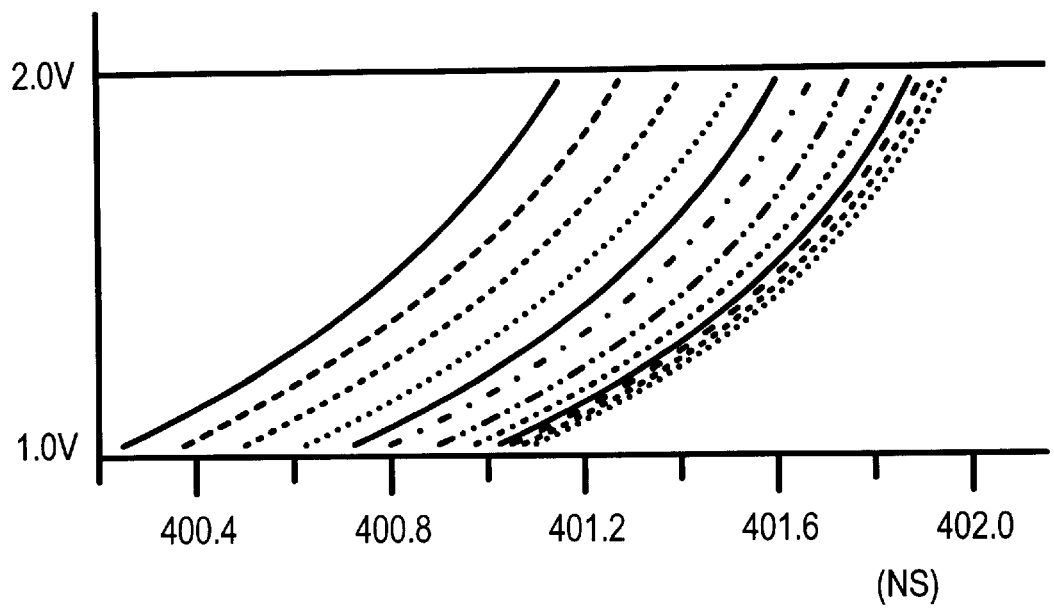
FIGS. 10A–D are waveforms showing clock skew for different shorting schemes.

In FIG. 10A, no shorting is performed. Each clock output is driven by its own pre-driver, as basically shown in FIG. 3. The 12 clock outputs cross the 1.5-volt logic threshold from 400.8 to 401.6 ns, for a maximum clock skew of 0.8 ns.

The greatest clock skew between adjacent clock outputs occurs between Y1 and Y2, since the most current (11 pre-drivers of current) passes through the upper-most resistors in the power bus. The least skew occurs between Y11, Y12, since only one pre-driver's current passes through the last power-bus resistor.

Figure 10B:
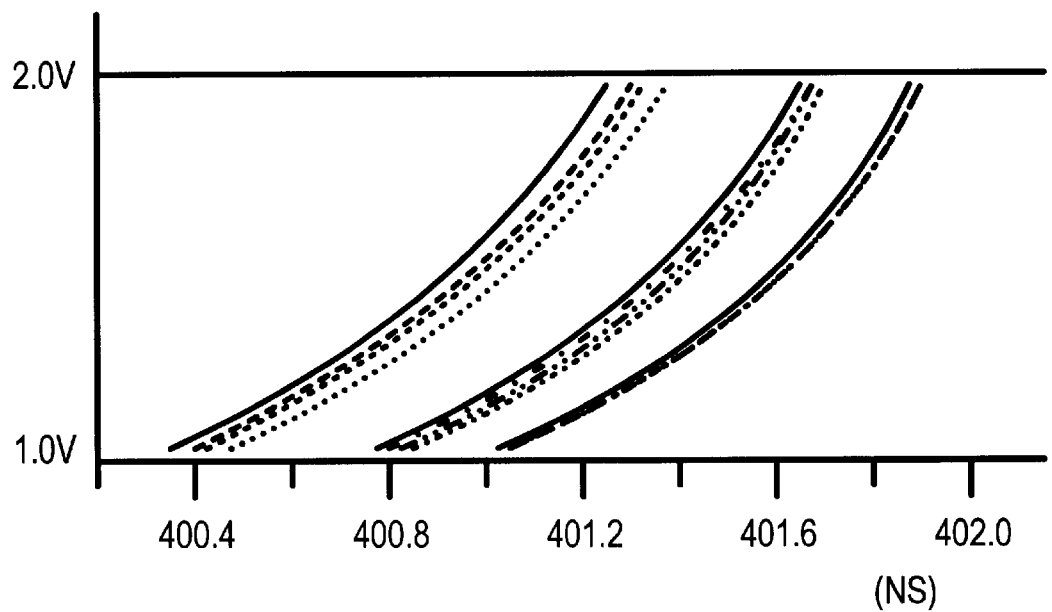

In FIG. 10B, shorting of the four pre-drivers within each bank is performed, but no shorting occurs between banks. This is FIG. 9 with switches 50, 51, 52 turned off, but with the hardwired connections within a bank. The 12 clock outputs cross the 1.5-volt logic threshold from 400.9 to 401.5 ns, for a maximum clock skew of 0.6 ns.

Clock skew is improved by 0.2 ns by shorting within each bank. Note that the skew within each bank of four clock outputs is significantly reduced by about 50%.

Figure 10C:
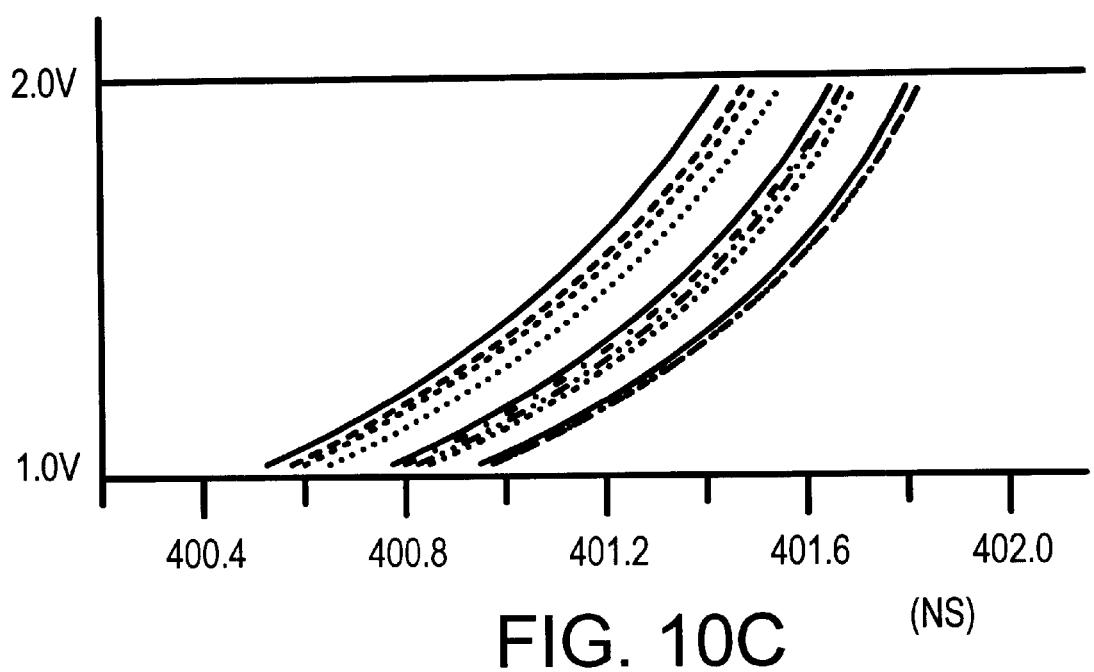

In FIG. 10C, shorting of the four pre-drivers within each bank is performed, and shorting of adjacent banks but not between remote banks 1, 3. This is FIG. 9 with switches 50, 51, turned on, but switch 52 turned off, and with the hardwired connections within a bank. The 12 clock outputs cross the 1.5-volt logic threshold from 401.1 to 401.5 ns, for a maximum clock skew of 0.4 ns.

Clock skew is improved by another 0.2 ns by shorting adjacent banks. Note that the skews from bank 1 to bank 2, and from bank 2 to bank 3, are significantly reduced.

Figure 10D:
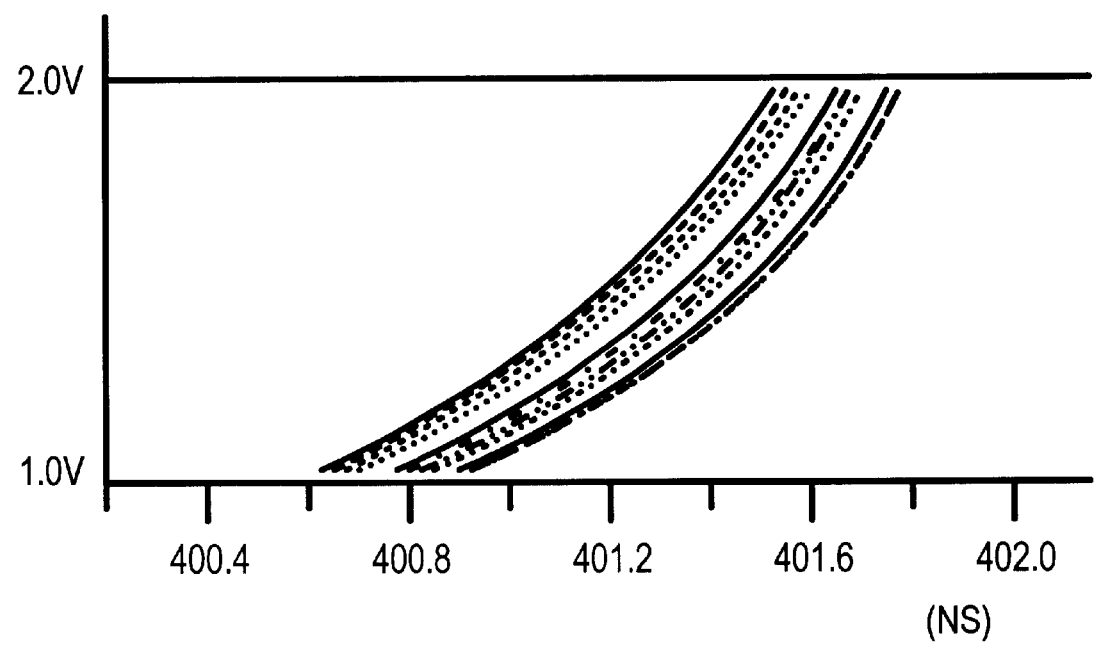

In FIG. 10D, shorting of the four pre-drivers within each bank is performed, and shorting occurs between banks. This is FIG. 9 with all switches 50, 51, 52 turned on, and with the hardwired connections within a bank. The 12 clock outputs cross the 1.5-volt logic threshold from 401.2 to 401.5 ns, for a maximum clock skew of 0.3 ns.

Clock skew is improved by another 0.1 ns by shorting remote banks 1, 3. Note that the skew from bank 1 to bank 3 is reduced further. The maximum clock skew among the 12 outputs was reduced by 0.5 ns from 0.8 to 0.3 ns using all forms of shorting.

Alternate Embodiments

Several other embodiments are contemplated by the inventors. For example the clock may be inverted or even gated with other signals at any of several points in the clock driver tree. The reference clock could be gated, or turned off to power down a system. Some of the clock outputs could be gated for powered while others are not. The clock may not be periodic, or may be some other signal. Different switches could have different sizes, as could the output buffers. Different output buffer designs in CMOS or BiCMOS can be used. The invention is not restricted to single-ended outputs but could be used with differential drivers. The shorting switch can be just an NMOS transistor, perhaps with a gate driven to a voltage above Vcc for reduced resistance and capacitance.

Rather than use XOR and XNOR gates, the switch could use a NAND gate and an AND gate. Then the switch shorts only when both enables are active, not when both enables are inactive. XOR and XNOR functions can be generated in many different circuits, and the XNOR gate can be mimicked by an inverter after the XOR gate; likewise the XOR gate could be replaced by an inverter after the XNOR gate. The XOR and XNOR gates can be integrated together in a single gate circuit that outputs both XOR and XNOR functions of the inputs. The transmission gates could have a single n-channel transistor, or could have both an n-channel and a p-channel transistor in parallel.

The clock driver chip could be a stand-alone integrated circuit chip, or it could be part of a larger system-on-a-chip where the clock outputs drive clock lines on the chip, rather than off-chip clock lines. The enables can be driven from inputs to the clock chip, or can be driven from register bits in a configuration register, or could be decoded from an encoded configuration word or from a few configuration pins of the chip. The enables can be static or dynamic.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. §1.72(b). Any advantages and benefits described may not apply to all embodiments of the invention. When the word "means" is recited in a claim element, Applicant intends for the claim element to fall under 35 USC §112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC §112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A parallel clock driver comprising:
   a reference clock;
   a plurality of pre-driver circuits, responsive to the reference clock, each pre-driver circuit outputting a pull-up pre-driver line and a pull-down pre-driver line and receiving an enable signal having an enabling state that enables the pre-driver circuit to drive high and low the pull-up and pull-down pre-driver lines in response to the reference clock;
   a plurality of output buffers, each having a pull-up transistor with a gate driven by the corresponding pull-up pre-driver line, and a pull-down transistor with a gate driven by the corresponding pull-down pre-driver line, each driving a clock output with the pull-up transistor and the pull-down transistor; and
   a plurality of shorting switches, each shorting switch receiving a pair of the enable signals for a pair of the pre-driver circuits, the shorting switch connecting together the pull-up pre-driver lines generated by the pair of pre-driver circuits when the pair of enable signals are both in the enabling state,
   whereby the pull-up pre-driver lines are connected together by the shorting switch when the pair of the pre-driver circuits are both enabled.

2. The parallel clock driver of claim 1 wherein the shorting switch further connects together the pull-down pre-driver lines generated by the pair of pre-driver circuits when the pair of enable signals are both in the enabling state, whereby he shorting switch shorts together the pull-up pre-driver lines and short together the pull-down pre-driver lines.

3. The parallel clock driver of claim 2 wherein each shorting switch comprises:

a first transmission gate for conducting current between a first and a second pull-up pre-driver line, the first pull-up pre-driver line generated by a first pre-driver circuit in the plurality of pre-driver circuits that is enabled by a first enable signal, while the second pull-up pre-driver line is generated by a second pre-driver circuit in the plurality of pre-driver circuits that is enabled by a second enable signal; and a second transmission gate for conducting current between a first and a second pull-down pre-driver line, the first pull-down pre-driver line generated by the first pre-driver circuit, while the second pull-down pre-driver line is generated by the second pre-driver circuit, whereby two transmission gates are used to connect pre-driver lines from the pair of pre-driver circuits.

4. The parallel clock driver of claim 3 wherein the first and second transmission gates each comprise a p-channel transistor and an n-channel transistor in parallel.

5. The parallel clock driver of claim 4 wherein each shorting switch further comprises:

a logic gate that receives the first and second enable signals, and generates a gate signal and a complement gate signal that are logical complements, the gate signal being activated when the first and second enable signals are both in the enabling state;

wherein the n-channel transistors in the first and second transmission gates have gates driven by the gate signal;

wherein the p-channel transistors in the first and second transmission gates have gates driven by the complement gate signal.

6. The parallel clock driver of claim 5 wherein each shorting switch further connects together the pull-up pre-driver lines generated by the pair of pre-driver circuits when the pair of enable signals are both in a non-enabling state, whereby the pull-up pre-driver lines are shorted when the pair of enable signals are both in a same state, either enabling or non-enabling.

7. The parallel clock driver of claim 6 wherein the logic gate in each shorting switch comprises:

an exclusive-OR (XOR) gate, receiving the first and second enable signals, for generating the complement gate signal to the first and second transmission gates;

an exclusive-NOR (XNOR) gate, receiving the first and second enable signals, for generating the gate signal to the first and second transmission gates.

8. The parallel clock driver of claim 4 wherein the plurality of pre-driver circuits include banks of pre-driver circuits wherein all pre-driver circuits within a bank receive a same enable signal and other banks receive different enable signals, whereby the same enable signal enables a bank of pre-driver circuits.

9. The parallel clock driver of claim 8 further comprising:

pull-up hardwired connections within a bank of pre-driver circuits, the pull-up hardwired connections connecting together the pull-up pre-driver lines within the bank; and pull-down hardwired connections within the bank of pre-driver circuits, the pull-down hardwired connections connecting together the pull-down pre-driver lines within the bank, whereby the pull-up and the pull-down pre-driver lines within a bank are hardwired together, and the shorting switches connect pairs of pre-driver lines in different banks.

10. The parallel clock driver of claim 9 wherein the pull-up transistor in an output buffer comprises a p-channel transistor with a drain driving the clock output and a source coupled to a power supply;

wherein the pull-down transistor in the output buffer comprises an n-channel transistor with a drain driving the clock output and a source coupled to a ground.

11. The parallel clock driver of claim 10 wherein each pre-driver circuit drives high the pull-up pre-driver line and drives low the pull-down pre-driver line when the enable signal to the pre-driver circuit is in a non-enabling state.

12. The parallel clock driver of claim 11 further comprising:

a clock buffer, receiving the reference clock, for buffering the reference clock before input to the plurality of pre-driver circuits, whereby the reference clock is buffered.

13. A reduced-skew clock driver comprising:

a clock input;

a plurality of cells, each cell receiving an enable signal and the clock input and outputting a clock output, each cell comprising:

pre-driver means, receiving the clock input and the enable signal, for driving high and low in response to the clock input an intermediate output when the enable signal is in an enabling state, and for driving a constant voltage onto the intermediate output when the enable signal is not in the enabling state; and output buffer means, receiving the intermediate output from the pre-driver means, for buffering the intermediate output to drive the clock output;

shorting means, receiving a first enable signal to a first cell and a second enable signal to a second cell in the plurality of cells, for shorting the intermediate output in the first cell to the intermediate output in the second cell when the first and second enable signals are both in the enabling state, and for isolating the intermediate output in the first cell from the intermediate output in the second cell when the first and second enable signals are in different states, whereby intermediate outputs are shorted to reduce skew when cells for two intermediate outputs are both enabled.

14. The reduced-skew clock driver of claim 13 wherein each intermediate output comprises a first intermediate output and a second intermediate output;

wherein the shorting means shorts the first intermediate outputs together and also shorts the second intermediate outputs together but does not short the first intermediate output to the second intermediate output, whereby each pre-drive means has two intermediate outputs that are separately shorted with other cells.

15. The reduced-skew clock driver of claim 14 further comprising:

intra-bank shorting means for shorting intermediate outputs within a bank of cells that receive a same enable signal, the intra-bank shorting means connecting together intermediate outputs of cells within a bank without regard to a state of the same enable signal, whereby intermediate outputs within a bank of cells having the same enable signal are shorted.

16. The reduced-skew clock driver of claim 15 wherein the shorting means shorts intermediate outputs for cells in different banks, while the intra-bank shorting means shorts intermediate outputs within a bank.

17. The reduced-skew clock driver of claim 16 wherein the intra-bank shorting means comprises first hardwired connections among all first intermediate outputs in a bank and second hardwired connections among all second intermediate outputs in a bank;

wherein the shorting means comprises a pair of transmission gates between each pair of banks.

18. A skew-reduced multi-output buffer comprising:

a data input;

a first enable input;

a second enable input;

a third enable input;

a first pre-driver, receiving the data input and the first enable input, outputting a first pull-up pre-driver line and a first pull-down pre-driver line;

a first pull-up transistor with a gate that receives the first pull-up pre-driver line, a source coupled to a power supply, and a drain that drives a first data output;

a first pull-down transistor with a gate that receives the first pull-down pre-driver line, a source coupled to a ground, and a drain that drives the first data output;

a second pre-driver, receiving the data input and the second enable input, outputting a second pull-up pre-driver line and a second pull-down pre-driver line;

a second pull-up transistor with a gate that receives the second pull-up pre-driver line, a source coupled to the power supply, and a drain that drives a second data output;

a second pull-down transistor with a gate that receives the second pull-down pre-driver line, a source coupled to the ground, and a drain that drives the second data output;

a third pre-driver, receiving the data input and the third enable input, outputting a third pull-up pre-driver line and a third pull-down pre-driver line;

a third pull-up transistor with a gate that receives the third pull-up pre-driver line, a source coupled to the power supply, and a drain that drives a third data output;

a third pull-down transistor with a gate that receives the third pull-down pre-driver line, a source coupled to the ground, and a drain that drives the third data output;

first shorting logic, receiving the first and second enable inputs, for activating a first short signal when the first and second enable inputs are both in an enabling state that cause the first and second pre-drivers to buffer the data input to the first and second pre-driver outputs;

a first pull-up shorting transistor, receiving the first short signal at a gate, for conducting current between the first pull-up pre-driver line and the second pull-up pre-driver line when the first short signal is activated;

a first pull-down shorting transistor, receiving the first short signal at a gate, for conducting current between the first pull-down pre-driver line and the second pull-down pre-driver line when the first short signal is activated;

second shorting logic, receiving the second and third enable inputs, for activating a second short signal when the second and third enable inputs are both in an enabling state that cause the second and third pre-drivers to buffer the data input to the second and third pre-driver outputs;

a second pull-up shorting transistor, receiving the second short signal at a gate, for conducting current between the second pull-up pre-driver line and the third pull-up pre-driver line when the second short signal is activated; and a second pull-down shorting transistor, receiving the second short signal at a gate, for conducting current between the second pull-down pre-driver line and the third pull-down pre-driver line when the second short signal is activated, whereby timing skews between the first, second, and third data outputs are minimized by shorting the pre-driver lines.

19. The skew-reduced multi-output buffer of claim 18 further comprising:

a first bank of pre-drivers and data outputs, wherein the first pre-driver, first pull-up transistor, and first pull-down transistor are in the first bank that includes other first pre-drivers that each receives the first enable input but drive other first pull-up pre-driver lines and other first pull-down pre-driver lines, other first pull-up transistors that receive the other first pull-up pre-driver lines, and other first pull-down transistors that receive the other first pull-down pre-driver lines, and drive other data outputs;

a second bank of pre-drivers and data outputs, wherein the second pre-driver, second pull-up transistor, and second pull-down transistor are in the second bank that includes other second pre-drivers that each receives the second enable input but drive other second pull-up pre-driver lines and other second pull-down pre-driver lines, other second pull-up transistors that receive the other second pull-up pre-driver lines, and other second pull-down transistors that receive the other second pull-down pre-driver lines, and drive other data outputs; and a third bank of pre-drivers and data outputs, wherein the third pre-driver, third pull-up transistor, and third pull-down transistor are in the third bank that includes other third pre-drivers that each receives the third enable input but drive other third pull-up pre-driver lines and other third pull-down pre-driver lines, other third pull-up transistors that receive the other third pull-up pre-driver lines, and other third pull-down transistors that receive the other third pull-down pre-driver lines, and drive other data outputs, whereby data outputs are enabled as three banks.

20. The skew-reduced multi-output buffer of claim 19 further comprising:

first pull-up hardwire connections, within the first bank, for connecting the first pull-up pre-driver lines to each other independent of the first enable input;

first pull-down hardwire connections, within the first bank, for connecting the first pull-down pre-driver lines to each other independent of the first enable input;

second pull-up hardwire connections, within the second bank, for connecting the second pull-up pre-driver lines to each other independent of the second enable input;

second pull-down hardwire connections, within the second bank, for connecting the second pull-down pre-driver lines to each other independent of the second enable input;

third pull-up hardwire connections, within the third bank, for connecting the third pull-up pre-driver lines to each other independent of the third enable input; and third pull-down hardwire connections, within the third bank, for connecting the third pull-down pre-driver lines to each other independent of the third enable input, whereby shorting logic and transistors short pre-driver lines in different banks, but hardwire connections short pre-driver lines within a bank.

* * * * *